United States Patent
Goller et al.

(10) Patent No.: US 8,372,251 B2
(45) Date of Patent: Feb. 12, 2013

(54) SYSTEM FOR PROTECTING GASIFIER SURFACES FROM CORROSION

(75) Inventors: George Albert Goller, Greenville, SC (US); Paul Stephen Dimascio, Greer, SC (US); Rebecca Evelyn Hefner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 12/785,302

(22) Filed: May 21, 2010

(65) Prior Publication Data

US 2011/0284368 A1 Nov. 24, 2011

(51) Int. Cl.
 C23F 13/06 (2006.01)
 C23F 13/10 (2006.01)
 C23F 13/16 (2006.01)

(52) U.S. Cl. ......... 204/196.37; 204/196.02; 204/196.04; 204/196.06; 204/196.1; 204/196.22; 204/196.23; 204/196.24; 204/196.25

(58) Field of Classification Search ............. 204/196.02, 204/196.04, 196.06, 196.07, 196.1, 196.22–196.25, 204/196.37

See application file for complete search history.

(56) References Cited

U.S. PATENT DOCUMENTS

| | | | |
|---|---|---|---|
| 3,216,916 A | | 11/1965 | Locke |
| 3,379,629 A | | 4/1968 | Banks et al. |
| 5,411,646 A | * | 5/1995 | Gossett et al. ............... 205/724 |
| 6,827,912 B2 | | 12/2004 | Schingnitz et al. |
| 2007/0085345 A1 | * | 4/2007 | Brown et al. .................. 290/44 |
| 2007/0251834 A1 | * | 11/2007 | Bollinger ....................... 205/727 |
| 2011/0203555 A1 | * | 8/2011 | Reinhart et al. ............... 123/536 |
| 2011/0284368 A1 | * | 11/2011 | Goller et al. .............. 204/196.02 |

FOREIGN PATENT DOCUMENTS

| | | |
|---|---|---|
| WO | 9947874 A1 | 9/1999 |
| WO | 0186220 A2 | 11/2001 |
| WO | 2004051167 A1 | 6/2004 |
| WO | 2005106076 A2 | 11/2004 |

OTHER PUBLICATIONS

MTO Investigates New Cathodic Protection Systems Revolutionising Bridge Rehabilitation; Ontario's Transportation Technology Transfer Digest—Feb. 2004—vol. 10, Issue 1; Ministry of Transportation Road Talk; http://www.mto.gov.on.ca/english/transtek/roadtalk/rt10-1/; p. 1 and 2.

LIDA Tubular Anodes; Cathodic Protection, De Nora Elettrodi Network.

Dr. Ing et al: Article-History of EFC-WP11 "Corrosion in Concrete"; Institute for Building Materials Research, ibac, Aachen University; 9 pages.

European Search Report Mailed Apr. 26, 2012.

* cited by examiner

*Primary Examiner* — Bruce Bell

(74) *Attorney, Agent, or Firm* — Fletcher Yoder, P.C.

(57) ABSTRACT

According to various embodiments, a system includes a gasifier that includes a shell made of a first material exposed to a gasification region inside the gasifier and a patterned anode layer coupled to the shell inside the gasifier. The patterned anode layer is made of a second material, and the patterned anode layer is configured to protect the shell from corrosion by condensing hot gas in the gasification region.

20 Claims, 5 Drawing Sheets

US 8,372,251 B2

SYSTEM FOR PROTECTING GASIFIER SURFACES FROM CORROSION

BACKGROUND OF THE INVENTION

The subject matter disclosed herein relates to gasifiers and, more particularly, to protecting gasifier surfaces from corrosion.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas, which may be treated prior to use as a fuel. The hot gases created in the gasifier may contain corrosive components. During typical operating conditions of the gasifier, the corrosive components may corrode surfaces of the gasifier in contact with the hot gases. Corroded portions of the gasifier may be repaired or replaced. The surfaces of the gasifier in contact with the hot gases may be made from corrosion resistant alloys to reduce corrosion. However, these alloys may be expensive and/or difficult to clad onto a less corrosion resistant shell.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier that includes a shell made of a first material exposed to a gasification region inside the gasifier and a patterned anode layer coupled to the shell inside the gasifier. The patterned anode layer is made of a second material, and the patterned anode layer is configured to protect the shell from corrosion by condensing hot gas in the gasification region.

In a second embodiment, a system includes a gasification component comprising a first material exposed to a flow of a condensing corrosive gas and an anode layer comprising a second material coupled to the first material. The anode layer is configured to protect the first material from corrosion by the condensing corrosive gas.

In a third embodiment, a system includes an active anode layer configured to protect a surface of a gasification component from corrosion by a gasification product gas, a reference electrode in contact with the gasification product gas, and a controller configured to adjust a current to the active anode layer in response to feedback from the reference electrode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
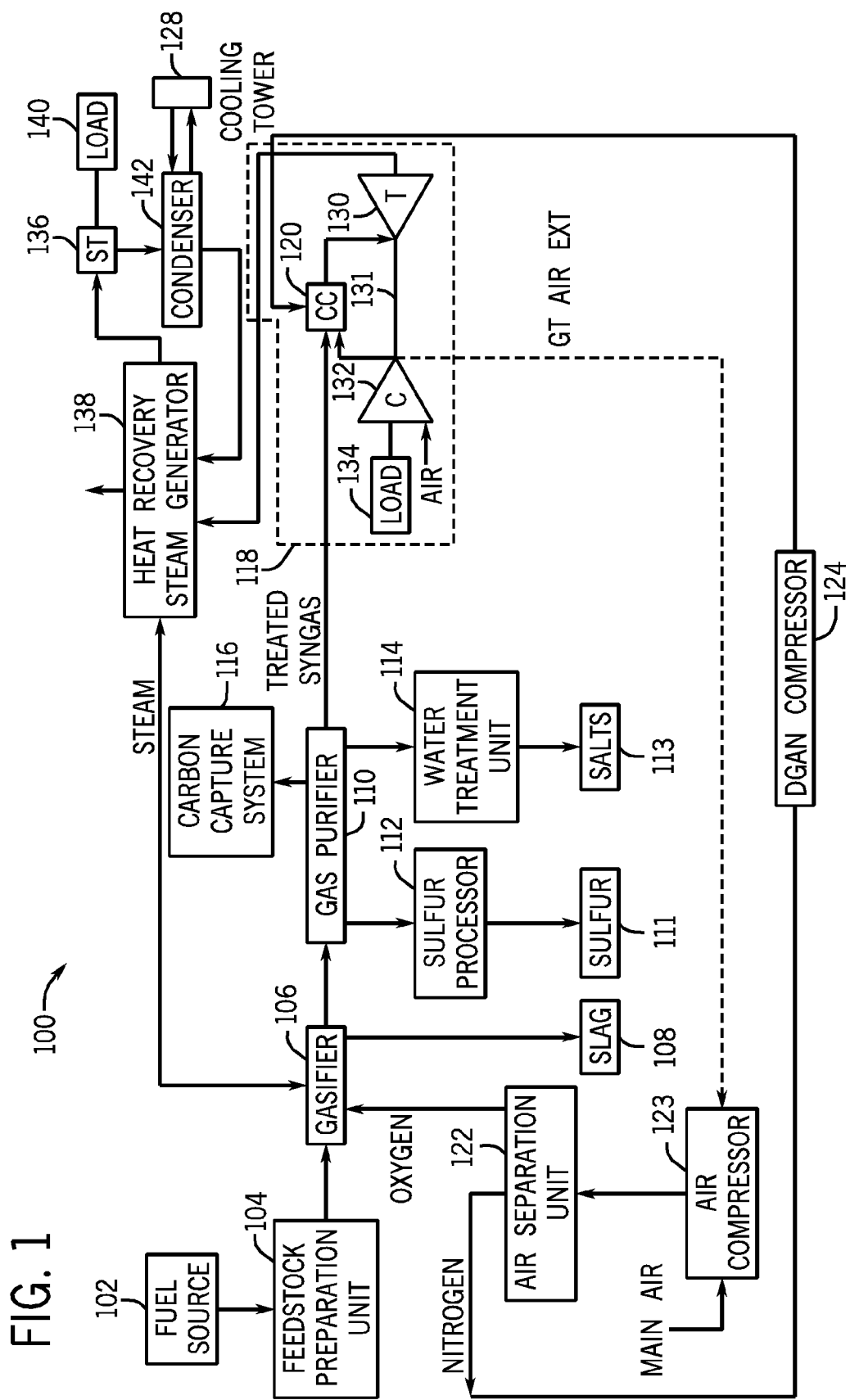
FIG. 1 is a block diagram of an IGCC power plant incorporating a gasifier according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Corrosion may refer to an electrochemical oxidation of metals reacting with an oxidant, such as oxygen. Corroded metal components may be replaced or repaired because the metal oxides may not have the same properties as the original metal. The conditions in a gasification region of a gasification component, such as a gasifier or gas treatment unit of an IGCC power plant, may contribute to at least one type of corrosion. Aqueous electrochemical corrosion may result from an electrochemical reaction associated with differences in electrical potentials of two different, electrically connected metals in an aqueous medium. The two different metals may be referred to as an active metal and a noble metal. Ions of noble metals are more strongly bound to a surface of the noble metal than ions of active metals. In addition, the noble and active metals may be electrically connected by being in physical contact with one another. Furthermore, examples of aqueous media, also referred to generally as electrolytes, may include, but are not limited to, solutions of acids, bases, or salts, certain gases at high temperatures, molten salts, or combinations thereof. Specifically, hot gases in the gasification region of the gasification component may condense to form a liquid on the walls of the gasification component and on other equipment.

During the electrochemical reaction of aqueous corrosion, ions from the active metal are released and flow through the aqueous medium to join with the noble metal. Concurrently, electrons flow from the active metal, or anode, to the noble metal, or cathode, through the electrical connection. By releasing its ions, the active metal may continue to corrode until it is completely consumed. In contrast, the noble metal may either not be affected or may corrode at a slower rate than the active metal. Examples of noble metals include, but are not limited to, silver, platinum, and gold. Furthermore, examples of active, or base, metals include, but are not limited to, iron, nickel, lead, and zinc.

In certain gasifiers, aqueous corrosion may occur where two different metals are in contact with one another in the presence of a salt, such as ammonium chloride ($NH_4Cl$), in the presence of water. The $NH_4Cl$ may be produced as a by-product in the gasifier and water may be introduced by injection of steam into the gasifier. In other gasifiers, two different metals may not be present, but aqueous corrosion can still occur according the following process. Certain metal surfaces of the gasifier may be passivated, which refers to a formation of a thin layer of metal oxide that acts as a barrier to further corrosion under conditions specific to the metal. Examples of metals that may undergo passivation include, but are not limited to, aluminum, stainless steel, titanium, or combinations thereof. An active-passive cell is created when salt deposits, such as $NH_4Cl$, in the presence of water form in areas of the metal where the passive film is broken. An electrical potential develops between the large area of the passive film, which acts as the noble metal or cathode, and the small area of active, unpassivated metal, which acts as the anode. Thus, even gasifiers made from a single metal may be subject to aqueous corrosion.

In particular embodiments discussed below, anodes may be used to help reduce aqueous corrosion or possibly other types of corrosion that may occur in gasification components. For example, sacrificial anode layers may be placed in electrical contact with metal surfaces to be protected from corrosion. Specifically, sacrificial anode layers are made from metals that are more electrochemically active than the metal surfaces of a shell of the gasifier. A hierarchy of metals, referred to as a galvanic series, may be used to determine whether a particular metal is more or less electrochemically active than another metal. More noble metals may be near one end of the galvanic series and more active metals may be near the other end of the galvanic series. Two metals are submerged in an electrolyte while electrically connected to determine the sequence of metals for the galvanic series. The less noble metal will experience galvanic corrosion. Moreover, the difference in nobility of the metals affects the rate of galvanic corrosion, which may be measured as a difference in voltage potential. Thus, two metals with a large difference in voltage potential may be farther apart in the galvanic series. In addition, the rate of galvanic corrosion may be affected by the electrolyte. Thus, the sequence of metals in the galvanic series may differ depending on the electrolyte.

Using the appropriate galvanic series based on the conditions in the gasifier, one or more different metals for the sacrificial anode layer are selected from those metals that are more electrochemically active than the metal used for the gasifier shell. Thus, the sacrificial anode layer will preferentially corrode instead of the metal of the gasifier shell. By using more than one metal for the sacrificial anode layer, after a first electrochemically active metal is consumed, the gasifier may still be protected by a second metal, for example. Alternatively, the more electrochemically active metal may be located in areas of the gasifier that are more susceptible to corrosion. Examples of metals that may be used for the sacrificial anode layer include, but are not limited to, carbon steel, aluminum, mixed metal oxides, or combinations thereof. Mixed metal oxides may refer to sacrificial anode layers with a surface made from a mixture of platinum group metals covering a substrate made from titanium. The mixture of platinum group metals is electrically conductive and activates the titanium, such that it functions as a sacrificial anode. In addition, to provide sufficient driving force for the sacrificial anode layer to be preferentially corroded, the difference in the voltage potential between the two metals may be between approximately 0.1 to 1.5 volt, 0.2 to 1.0 volt, or 0.3 to 0.5 volt. In other words, the metal for the sacrificial anode layer may be approximately 10 percent, 50 percent, 500 percent, or 1,500 percent more electrochemically active than the metal for the gasifier shell. When properly selected, ions and electrons will flow under corrosive conditions from the sacrificial anode layer to the metal of the gasifier shell, which acts as the cathode, at a sufficient rate until the sacrificial anode layer is completely consumed. At that point, a new sacrificial anode layer is installed to continue to protect the gasifier shell from corrosion.

In other embodiments, an impressed current system may be used to actively protect metal from corrosion. In contrast to the sacrificial anode layers discussed above, the anode layer of an impressed current system is not consumed or is consumed very slowly during protection of the gasifier shell. Instead, the anode layer is connected to an external electrical power source and a transformer rectifier, which creates a potential difference between the anode layer and the structure to be protected. The potential difference impresses, or transfers, electrons from the aqueous medium via chemical oxidation/reduction reactions at a surface of the anode layer to the surface of the gasifier shell. Hence, in a properly configured system, the anode layer is not consumed. Because the anode layer of the impressed current system is not consumed, the anode layer may be smaller than sacrificial anode layers. The addition of electrons, or electrical current, from the anode layer to the gasifier shell may reduce aqueous corrosion by helping to prevent the metal of the gasifier shell from releasing electrons and being corroded. However, if the flow of electrons from the anode layer is insufficient, corrosion of the gasifier shell may still occur. Alternatively, if the flow of electrons is too high, the gasifier shell may be damaged by hydrogen embrittlement. Under certain conditions, hydrogen ions present in the electrolyte may be reduced to hydrogen atoms at the cathode. The hydrogen atoms may permeate the granular structure of certain metals, such as high strength steels, causing hydrogen embrittlement. Thus, one method to determine that a proper flow of electrons is transferred from the anode layer is to install a reference electrode in the gasifier. The reference electrode may be used to monitor the electrical potential across the gasifier shell and the reference electrode and sends a signal to a controller to maintain the electrical potential across the reference electrode and the gasifier shell within an acceptable range. Reference electrodes may also be used with sacrificial anode layers to indicate when to replace the sacrificial anode layers.

With either sacrificial anode layers or impressed current systems, several steps may be performed to determine specifications of a corrosion protection system. First, a suitable protection potential of the metal used for the gasifier shell during operation is determined. Laboratory testing using a protentiostat may be used to predict the required protection potential if it cannot be measured during actual operation. Next, a protection current for the gasifier shell is determined. The protection current is a function of a surface area of the structure to be protected, an electrolyte flow rate, an operating temperature range, and a geometry of the protected structure. In addition, a suitable anode coverage scheme and configuration is determined based on the geometry of the protected structure and an anode throwing power, which may refer to an ability of the anode to protect recessed or blind areas of the structure. Next, a suitable surface area of the anode is determined to obtain an anode current that is greater than the protection current. The surface area of the anode is a function of the anode surface area and the material selected for the anode. Finally, a mass of anode material is determined as a function of the protection current and a suitable service time. This last step may not apply to impressed current systems as the anode layer is not typically consumed. Knowing these specifications, the corrosion protection system may be configured to help reduce corrosion of the gasifier shell.

Although described separately, both systems described above may be used simultaneously in certain embodiments of gasifiers. For example, if electrical current is unavailable for the impressed current system, the sacrificial anode layer may continue to protect the surface of the gasifier shell. Alternatively, if the sacrificial anode layer is completely consumed, the impressed current system may continue to help reduce corrosion. In other embodiments, the sacrificial anode layer or the impressed current system may be installed individually to reduce complexity and/or costs. Initially, using sacrificial anodes layers may be less costly and simpler than an impressed current system as no reference electrode, power source, transformer rectifier, and/or controller is used. However, the sacrificial anode layers are replaced on a regular basis as they are consumed, resulting in ongoing replacement costs and maintenance downtime.

Both sacrificial anode layers and impressed current systems offer several advantages over other methods of corrosion protection. For example, such systems may be less costly than using expensive corrosion resistant alloys. In addition, such systems may enable operation of the gasifier at higher pressures and temperatures where efficiency is greater. Lower pressures and temperatures may reduce corrosion, but also reduce efficiency. Finally, such systems may enable lower quality and/or less expensive fuel to be combusted in the gasifier. Higher quality fuel may contain fewer corrosive gases, but may be more expensive than lower quality fuel.

Turning now to the drawings, FIG. 1 is a diagram of an embodiment of an IGCC system 100 that may produce and burn syngas. The IGCC system 100 may include an embodiment of the gasification component with surfaces subject to corrosion that are protected by sacrificial anode layers and/or impressed current systems. In addition, other gas treatment or gas purifying components, carbon capture components, or any other components of the IGCC system 100 susceptible to corrosion may be protected by embodiments of sacrificial anode layers and/or impressed current systems. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The feedstock may be passed to a gasifier 106 from the feedstock preparation unit 104. Surfaces of the shell of the gasifier 106 in contact with a hot condensing gas, or condensing gasification product gas, as described below may be subject to corrosion and thus, may be protected by sacrificial anode layers and/or impressed current systems. The gasifier 106 may convert the feedstock into a syngas, e.g., a combination of carbon monoxide (CO) and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius (C) to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., CO, hydrogen, and nitrogen). The char remaining from the feedstock from the pyrolysis process may only weigh up to approximately 30% of the weight of the original feedstock.

The volatiles generated during the pyrolysis process, also known as devolatilization, may be partially combusted by introducing oxygen to the gasifier 106. The volatiles may react with the oxygen to form $CO_2$ and CO in combustion reactions, which provide heat for the subsequent gasification reactions. The temperatures generated by the combustion reactions may range from approximately 700 degrees C. to 1600 degrees C. Next, steam may be introduced into the gasifier 106 during a gasification step. The char may react with the $CO_2$ and steam to produce CO and hydrogen at temperatures ranging from approximately 800 degrees C. to 1100 degrees C. In essence, the gasifier utilizes steam and oxygen to allow some of the feedstock to be "burned" to produce CO and release energy, which drives a second reaction that converts further feedstock to hydrogen and additional $CO_2$.

In this way, the gasifier 106 manufactures a resultant gas. This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. A gas purifier 110 may be utilized to clean the untreated syngas. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. The cooled carbon dioxide (e.g., approximately 20-40 degrees C., or about 30 degrees C.) may be circulated through the system to meet its refrigeration needs or expanded through subsequent stages for even lower temperatures. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
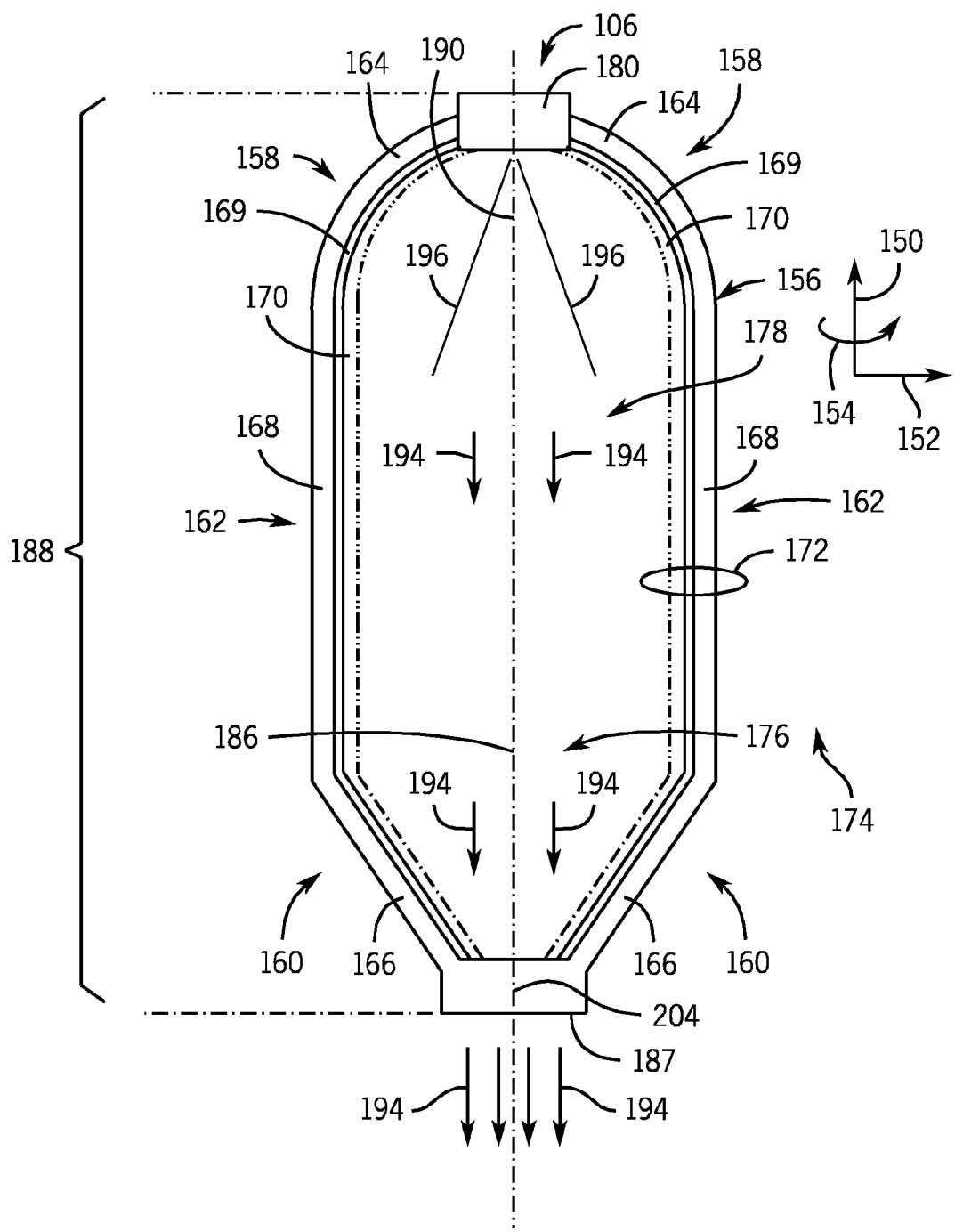
FIG. 2 is a cross-sectional side view of an embodiment of the gasifier of FIG. 1 including an anode layer.

FIG. 2 is a cross-sectional side view of an embodiment of the gasifier 106 for use with the IGCC system 100 of FIG. 1 with an anode layer 169. The gasifier 106 may have an axial axis or direction 150, a radial axis or direction 152, and a circumferential axis or direction 154. The gasifier 106 includes an enclosure 156, also referred to as the shell, that functions as a housing or outer casing for the gasifier 106. The enclosure 156 includes a first end portion 158 and a second end portion 160. An intermediate portion 162 is defined by the section of the enclosure 156 that lies axially between the first end portion 158 and the second end portion 160. The first end portion 158 and the second end portion 160 include a dome-shaped top wall 164, and a triangular-shaped (e.g., conical shaped) bottom wall 166, respectively. A side wall 168 (e.g., annular side wall) parallel to the axis 150 is disposed in the intermediate portion 162 between the top wall 164 and the bottom wall 166. As the top wall 164, the bottom wall 166, and the side wall 168 may all come in contact with condensing hot gas, surfaces of these walls may be protected by sacrificial anode layers and/or impressed current systems.

In the illustrated embodiment, the anode layer 169 is coupled to the enclosure 156. As described above, the anode layer 169 may include a sacrificial anode layer, an anode layer for an impressed current system, or a combination thereof. In addition, the anode layer 169 is made from a different metal than the enclosure 156. Furthermore, the anode layer 169 may be configured as a layer rather than individual anode blocks because the electrolyte may exist as a thin layer covering the internal surface of the enclosure 156. The thin layer of electrolyte may hinder ion transport, and thus, the throwing power of the anode. Configuring the anode layer 169 as a layer distributes the throwing power over a large, uniform area, which may help overcome the hindered ion transport through the electrolyte layer. In addition, the anode layer 169 may be attached to the entire inside surface of the enclosure 156 of the gasifier 106 or portions thereof. For example, the anode layer 169 may be installed only on internal surfaces of the enclosure 156 that are most susceptible to corrosion. In addition, the thickness and/or materials selected for the anode layer 169 may be varied based on the location within the enclosure 156. Moreover, one or more anode layers 169 may be coupled on top of each other to provide additional strength and/or durability to the anode structure.

Specific embodiments of the anode layer 169 are discussed in detail below. Methods of attaching the anode layer 169 to the enclosure 156 may vary depending on the particular configuration of the anode layer 169. However, in all methods, the anode layer 169 is in electrical contact with the metal of the enclosure 156. For example, the anode layer 169 may be configured as a metal mesh, grid, or foil, which may be attached to the enclosure 156 by methods, such as, but not limited to, welding, bolting, or other suitable techniques for mechanically affixing two metal structures. Alternatively, the anode layer 169 may be a composite material. For example, a layer of an insulating matrix, such as, but not limited to, grout, ceramic or silicate matrices, or combinations thereof, may be applied to the surface of the enclosure 156. The anode layer 169 is coupled to the enclosure 156 by pressing the anode layer 168 into the grout. A thickness of the layer of grout is the same as or less than a thickness of the anode layer 169 to enable the anode layer 169 to contact the enclosure 156 and be exposed to the corrosive gases. In a further example, the anode layer 169 may be formed by continuously adhering a patterned coating to the enclosure 156. Examples of coating methods include, but are not limited to, printing, spray coating, brushing, electrochemical deposition, dipping, photo etching, sputtering, or combinations thereof. Thus, by using methods, such as those described above, the throwing power of the anode layer 169 may be uniformly distributed across the protected surface of the enclosure 156.

The illustrated embodiment also includes a thermal barrier 170 concentrically disposed inside the enclosure 156. The thermal barrier 170, the anode layer 169, and the enclosure 156 form a wall assembly 172 that separates an exterior 174 of the gasifier 106 from an interior 176 of the gasifier 106. Thus, the anode layer 169 is disposed between the shell of the gasifier 106 and the thermal barrier 170. The interior 176 includes a gasification chamber 178 where pyrolysis, combustion, gasification, or a combination thereof, may occur as previously described with respect to FIG. 1. The wall assembly 172 is configured to block heat transfer and leakage of gaseous components from the interior 176 to the exterior 174 during gasification. Additionally, the thermal barrier 170 may be configured to maintain the surface temperature of the enclosure 156 within a desired temperature range. Accordingly, the thermal barrier 170 may include passive shielding, active cooling, or a combination thereof. For example, in embodiments where the thermal barrier 170 is a passive thermal shield, it may be made of a variety of refractory materials (e.g., bricks) capable of withstanding temperatures up to or greater than approximately 500 degrees C., 1000 degrees C., 1500 degrees C., or even 2000 degrees C. That is, the thermal barrier 170, or refractory insulating lining, may be made of any material that maintains its predetermined physical and chemical characteristics upon exposure to such high temperatures. Suitable refractory materials for use as the thermal barrier 170 may include ceramics (e.g., clay or minerals), metals (e.g., titanium, tungsten), cermets (i.e., ceramic and metal composites), or other refractory materials (e.g., silica, aluminum oxide). The refractory materials may be attached to the anode layer 169 using a refractory grout coating, for example. For further example, certain embodiments may employ an active thermal cooling system as a component of the thermal barrier 170. In such embodiments, cooling tubes may be used for temperature reduction purposes. That is, a coolant (e.g., chilled water) may be circulated through one or more tubes to lower the surface temperature of the enclosure 156. The cooling tubes may also be susceptible to corrosion and thus, may be protected by an extension of the anode layer 169 and/or with a separate anode layer.

In the embodiment illustrated in FIG. 2, an injector 180 is disposed in the top wall 164 of the first end portion 158 of the enclosure 156. The injector 180 is longitudinally offset from an outlet 187 by a distance 188 and includes an injection axis 190 that determines the general orientation of the flow originating from the injector 180. The injector 180 may be configured to inject fuel, oxygen (e.g., air), or a mixture of fuel and oxygen into the gasification chamber 178. For instance, the injector 180 may inject fuel in the form of carbonaceous material, such as coal, petroleum, or biomass. In fact, the injector 180 may inject any material suitable for the production of syngas via gasification (e.g., organic materials, such as wood or plastic waste). For further example, the injector 180 may inject a controlled amount of oxygen and/or steam either alone or in combination with a suitable fuel.

In the illustrated embodiment, the injection axis 190 is parallel to the axis 150 and perpendicular to the radial axis 152 of the gasifier 106. In other words, the injection axis 190 is parallel to a longitudinal axis 186. Such a feature has the effect of directing a fluid flow emerging from the injector 180 in a generally downward direction (e.g., downstream flow direction), as indicated by arrows 194, through the gasification chamber 178 during use. In certain embodiments, the injection axis 190 may be directed away from the longitudinal axis 186 by an angle between approximately 0 to 45, 0 to 30, 0 to 20, or 0 to 10 degrees. Furthermore, certain embodiments of the injector 180 may provide a divergent spray, e.g., fluid flow originating from the injector 180 may diverge outward toward the side walls 168 in a generally downward direction (e.g., downstream flow direction), as indicated by reference numeral 196.

In the illustrated embodiment of the gasifier 106, the resultant syngas emerges from the gasifier 106 via outlet 187 along a path generally defined by outlet axis 204. That is, the syngas exits the gasifier 106 via a location in the bottom wall 166 of the gasifier 106. However, it should be noted that the gasifier design disclosed herein may be used with a variety of other gasification systems wherein the outlet is not disposed in a bottom wall. For instance, the disclosed embodiments may be used in conjunction with entrained flow gasifiers. In such embodiments, the direction of flow through the gasification chamber 178 may be upward through the gasifier 106, i.e., in a direction opposite arrows 194. In these systems, the resultant syngas may exit an outlet located on or near the top wall 164 of the gasifier 106, while the molten slag may exit through the bottom wall 166. For further example, the disclosed embodiments may be employed in fluidized bed gasifiers. Likewise, the outlet in such devices may be located near the top wall 164 of the gasifier 106 since the direction of flow is generally upward.

Figure 3:
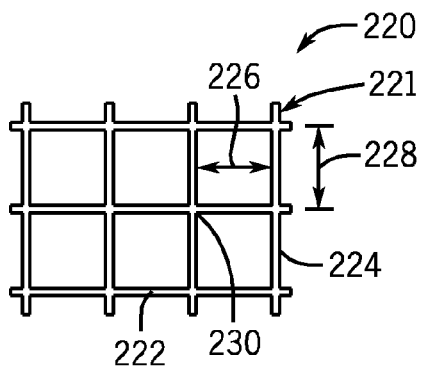
FIG. 3 is a schematic of an embodiment of an anode layer patterned as a grid to be coupled to a gasifier.

Turning now to various patterns of anode layers, FIG. 3 shows a schematic of an embodiment of an anode system 220 patterned as a grid 221, which includes horizontal members 222 and vertical members 224 in a perpendicular arrangement. The horizontal and vertical members 222 and 224 may include, but are not limited to, metal wires, rods, bars, billets, bands, strips, or any other metal piece longer than it is wide. Although shown straight in FIG. 3, in other embodiments, the horizontal and vertical members 222 and 224 may be curved, bowed, twisted, bent, coiled, or configured in other shapes, for example. In addition, the horizontal and vertical members 222 and 224 interconnect at points 230, which provide for electrical continuity throughout the system 220. Methods for making the interconnection points 230 include, but are not limited to, welding, bolting, or other suitable techniques for mechanically affixing two metal structures. The vertical members 224 are spaced apart by a first distance 226 and the horizontal members 222 are spaced apart by a second distance 228. In various embodiments, the distances 226 and 228 may be the same or different. In addition, although shown with regular horizontal and vertical spacing, in further embodiments, the horizontal and vertical members 222 and 224 may be spaced apart at different intervals or at irregular intervals. The arrangement of the anode system 220 as a grid 221 may provide for a uniform throwing power for the anode layer 169.

In certain embodiments, the anode system 220 may be configured as a sacrificial anode layer, which may be consumed during operation of the gasifier 106 as described above. This occurs because the metal used for the anode layer 169 is electrochemically more active than the metal used for the gasifier 106. Thus, the anode layer 169 preferentially corrodes to protect the gasifier 106. In other embodiments, an impressed current system may be used and the anode layer 169 provides electrons from the aqueous medium via oxidation/reduction reactions with the aqueous medium to help reduce corrosion of the gasifier 106 without being consumed itself. In addition, as described above, portions of the anode layer 169 may be electrically connected at points 230 to enable a single transformer rectifier to impress electrical current to all the connected portions of the anode layer 169. For example, a negative pole of the transformer rectifier may be connected to only one portion of the grid 221 of system 220. A positive pole of the transformer rectifier for the impressed current system may be connected to the surface of the enclosure 156 of the gasifier 106. Thus, electrons may flow from the aqueous medium at the surface of the anode layer 169, through the electrolyte, and to the gasifier 106.

Figure 4:
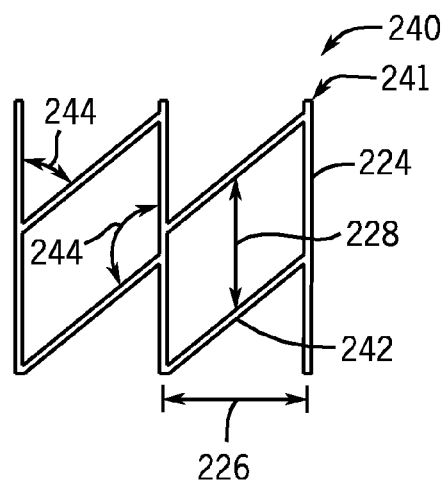
FIG. 4 is a schematic of an embodiment of an anode layer patterned as a grid with non-perpendicular cross-members to be coupled to a gasifier.

FIG. 4 is a schematic of an embodiment of an anode system 240 patterned as a grid 241 with non-perpendicular cross-members 242. Elements in FIG. 4 in common with those shown in FIG. 3 are labeled with the same references numerals. In the illustrated embodiment, the non-perpendicular cross-members 242 provide a different method of interconnecting and supporting the vertical members 224. Specifically, the angled cross-members 242 are similar to the horizontal members 222 of FIG. 3, but are non-perpendicular to the vertical members 224. In other words, an angle 244 between the cross-members 242 and the vertical members 224 is either greater than or less than approximately 90 degrees. Other aspects of the system 240 are similar to those of the system 220 of FIG. 3.

Figure 5:
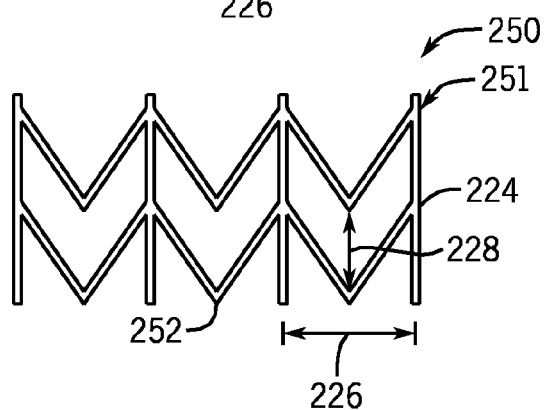
FIG. 5 is a schematic of an embodiment of an anode layer patterned as a grid with chevrons to be coupled to a gasifier.

FIG. 5 is a schematic of an embodiment of an anode system 250 patterned as a grid 251 with chevrons 252 or V-shaped members. Elements in FIG. 5 in common with those shown in FIG. 3 are labeled with the same references numerals. In the illustrated embodiment, the chevrons 252 interconnect and support the vertical members 224. Such a configuration of the system 250 may help direct any condensed liquids away from the walls of the enclosure 156 and toward the outlet 187 of the gasifier 106 as shown in FIG. 2. Reduced exposure to condensed liquids may help diminish the amount of corrosion of the walls of the enclosure 156.

Figure 6:
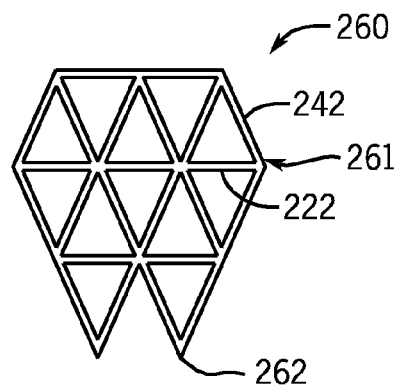
FIG. 6 is a schematic of an embodiment of an anode layer patterned as a grid with triangles to be coupled to a gasifier.

FIG. 6 shows a schematic of an embodiment of an anode system 260 patterned as a grid 261 with triangles 262. Elements in FIG. 6 in common with those shown in FIG. 3 are labeled with the same references numerals. The triangles 262 in the illustrated embodiment are formed from alternating angled cross-members 242. As with previous systems, the grid 261 may provide for a more evenly dispersed throwing power for the system 260. Other aspects of the system 260 are similar to those of systems discussed above.

Figure 7:
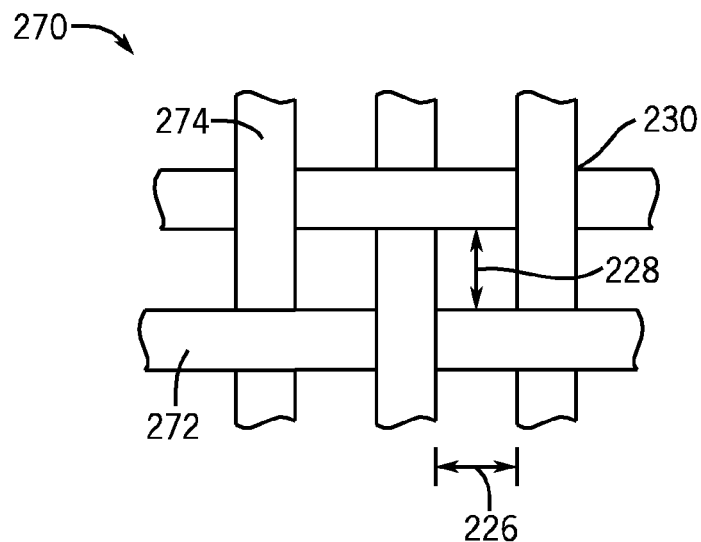
FIG. 7 is a schematic of an embodiment of an anode layer patterned as a weave of metal ribbons to be coupled to a gasifier.

FIG. 7 shows a schematic of an embodiment of an anode system 270 patterned as a weave of metal ribbons, which includes horizontal ribbons 272 and vertical ribbons 274 in a perpendicular arrangement. Alternatively, the ribbons 272 and 274 may be non-perpendicular to one another. Elements in FIG. 7 in common with those shown in FIG. 3 are labeled with the same references numerals. The horizontal and vertical ribbons 272 and 274 may include, but are not limited to, metal strips, bands, belts, straps, swaths, or any other long, narrow pieces of thin metal. Although shown straight in FIG. 7, in other embodiments, the horizontal and vertical ribbons 272 and 274 may be curved, bowed, twisted, bent, coiled, or configured in other shapes, for example. In addition, the horizontal and vertical ribbons 272 and 274 interconnect at points 230, which provide for electrical continuity throughout the system 270. Methods for making the interconnection points 230 include, but are not limited to, welding, bolting, or other suitable techniques for mechanically affixing two metal structures. The vertical ribbons 274 are spaced apart by a distance 226 and the horizontal ribbons 272 are spaced apart by a distance 228. In various embodiments, the distances 226 and 228 may be the same or different. In addition, although shown with regular horizontal and vertical spacing, in further embodiments, the horizontal and vertical ribbons 272 and 274 may be spaced apart at different intervals or at irregular intervals. The arrangement of the anode system 270 as a weave of ribbons may provide for a uniform throwing power for the anode layer 169.

Figure 8:
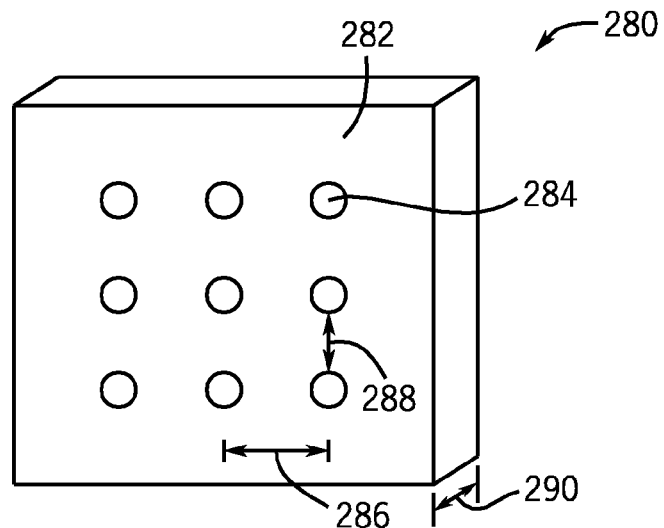
FIG. 8 is a schematic of an embodiment of a perforated foil anode layer patterned with circles to be coupled to a gasifier.

FIG. 8 shows a schematic of an embodiment of an anode system 280 with a foil 282 patterned with circle-shaped perforations 284, which are punched all the way through the foil 282. The foil 282 may be easier to handle or install than the grids described above and may provide for a uniform throwing power for the anode layer 169. In addition, providing circle-shaped perforations 284 may reduce the amount of foil 282 used to cover the surface of the enclosure 156. Shapes other than circles may be used the perforations 284, such as, but not limited to, ovals, triangles, squares, rectangles, diamonds, polygons, and irregular shapes. Although shown in rows and columns, the circle-shaped perforations 284 may be arranged in other patterns or in irregular patterns in further embodiments. For example, the circle-shaped perforations 284 may be arranged in a circular pattern. In addition, a horizontal distance 286 and a vertical distance 288 may separate the circle-shaped perforations 284. The horizontal and vertical distances 286 and 288 may be the same or different and may be uniform or non-uniform. Furthermore, the foil 282 has a thickness 290, which may be between approximately 0.01 to 5 mm, 0.03 to 1 mm, or 0.05 to 0.5 mm. The specific thickness 290 selected for a particular application may depend on the mass of anode material determined using the method described above.

Figure 9:
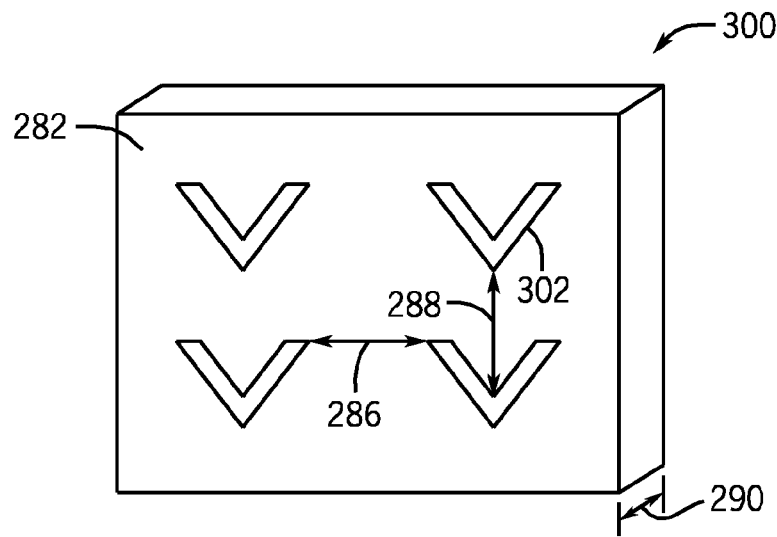
FIG. 9 is a schematic of an embodiment of a perforated foil anode layer patterned with chevrons to be coupled to a gasifier.

FIG. 9 shows a schematic of an embodiment of an anode system 300 with a foil 282 patterned with chevron-shaped perforations 302, which are punched all the way through the foil 282. Elements in FIG. 9 in common with those shown in FIG. 8 are labeled with the same references numerals. Such a configuration of the chevron-shaped perforations 302 may help direct any condensed liquids away from the walls of the enclosure 156 and toward the outlet 187 of the gasifier 106 as shown in FIG. 2. Reduced exposure to condensed liquids may help diminish the amount of corrosion of the walls of the enclosure 156. Other aspects of the system 300 are similar to those of system 280 shown in FIG. 8.

Figure 10:
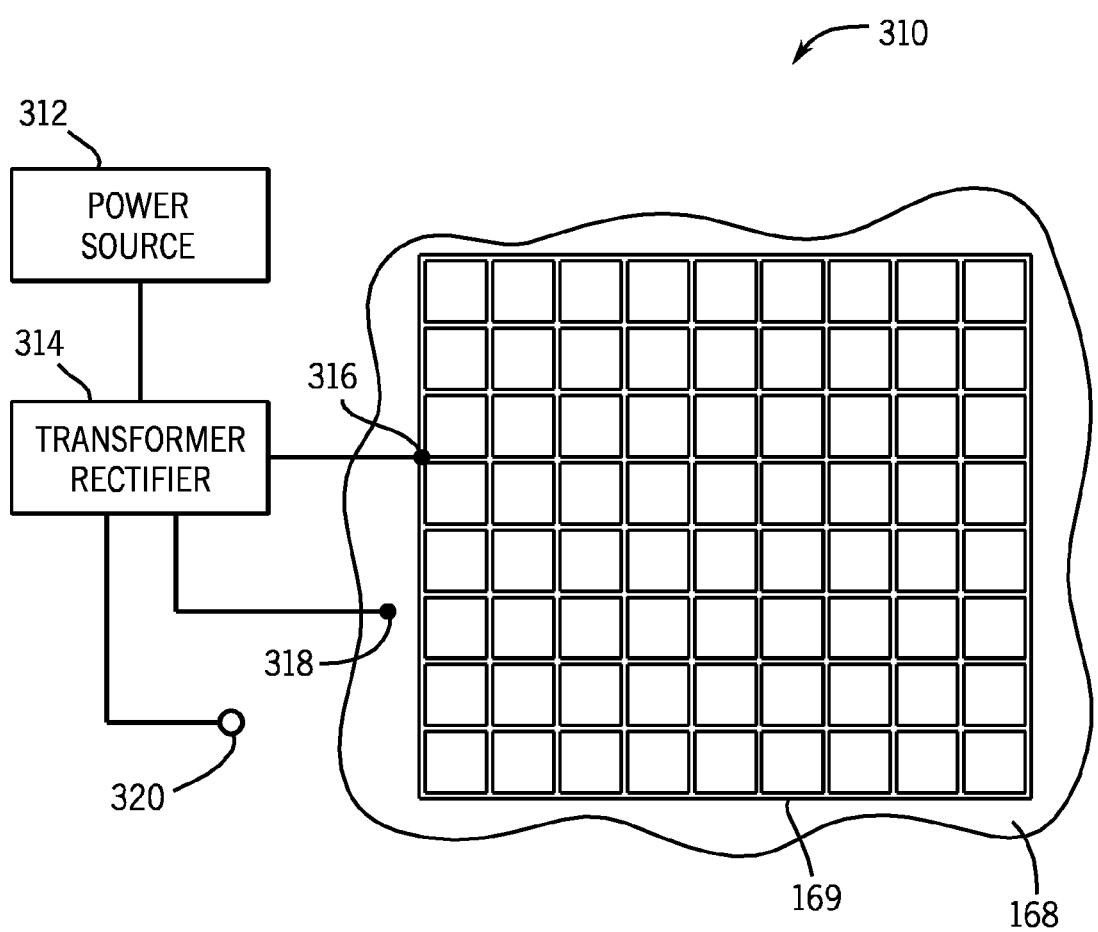
FIG. 10 is a schematic of a system that controls an electrical current to a patterned anode layer disposed in a gasifier.

FIG. 10 shows a schematic of an embodiment of a system 310 that includes a controller to adjust electrical current to the anode layer 169. In the illustrated embodiment of the impressed current system, a power source 312 provides a relatively constant source of electric current, such as alternating current (AC), to a transformer rectifier 314. For example, the power source 312 may provide high voltage 3-phase AC to the transformer rectifier 314, which may "step down" the voltage to a lower voltage and convert the AC to direct current (DC). By connecting the positive terminal of the transformer rectifier 314 to the anode layer 169 at first connection 316 and connecting the negative terminal to the wall 168 of the gasifier 106 at second connection 318, the transformer rectifier 314 provides a potential difference across the anode layer 169 and the gasifier 106. Connection of the gasifier 106 and the anode layer 169 via electrical contact and ionic contact in the aqueous medium completes the electrochemical circuit. Thus, electrons flow from the aqueous medium at the surface of the anode layer 169, through the electrolyte, and to the gasifier 106. However, the electrochemical current is said to flow in the opposite direction according to normal convention.

In addition, a reference electrode 320 may be connected to the transformer rectifier 314 of system 310. The reference electrode 320 may represent a fixed potential against which the measured potential of the gasifier 106 may be compared. In addition, the transformer rectifier 314 may act as a controller to maintain the proper protection potential across the reference electrode 320 and the gasifier 106. The protection potential may be determined based on laboratory testing or actual operating measurements as described above. For example, in certain embodiments, the reference electrode 320 may indicate via feedback to the transformer rectifier 314 (or controller) that the measured potential across the reference electrode 320 and the gasifier 106 is less than the proper protection potential. The transformer rectifier 314 may then increase the electrical potential difference between the anode layer 169 and the gasifier 106, such that the current increases from the anode layer 169 to the gasifier 106. Thus, by using the reference electrode 320 and the transformer rectifier 314, the system 310 may continually adjust to respond to changing conditions and help reduce corrosion of the gasifier 106. In addition, although the system 310 represents an impressed current system, sacrificial anodes may be coupled to the gasifier 106 to serve as a backup method of corrosion protection as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a gasifier comprising a shell made of a first material exposed to a gasification region inside the gasifier; and
 a patterned anode layer coupled to the shell inside the gasifier, wherein the patterned anode layer is made of a second material, and the patterned anode layer is configured to protect the shell from corrosion by condensing hot gas in the gasification region.

2. The system of claim 1, wherein the patterned anode layer is configured to protect the shell from aqueous electrochemical corrosion.

3. The system of claim 1, comprising a refractory insulating lining disposed inside the shell, wherein the patterned anode layer is disposed between the shell and the refractory insulating lining.

4. The system of claim 1, wherein the patterned anode layer comprises a composite material having a metallic anode pattern disposed in an insulating matrix.

5. The system of claim 1, wherein the patterned anode layer comprises a metallic wire mesh coupled to the shell.

6. The system of claim 1, wherein the patterned anode layer comprises a patterned coating continuously adhered to the shell.

7. The system of claim 1, comprising a power source that supplies power to a transformer rectifier coupled to the patterned anode layer, wherein the transformer rectifier is configured to impress a current through the patterned anode layer to actively protect the first material from corrosion by the condensing hot gas.

8. The system of claim 7, comprising a reference electrode and a controller configured to adjust the current to the patterned anode layer in response to feedback from the reference electrode.

9. The system of claim 1, wherein the second material is electrochemically more active than the first material, and the second material is configured to preferentially corrode to protect the first material from corrosion by the condensing hot gas.

10. The system of claim 1, wherein the patterned anode layer comprises a third material that is electrochemically more active than the first material and the second material.

11. A system, comprising:
 a gasification component comprising a first material exposed to a flow of a condensing corrosive gas; and
 an anode layer comprising a second material coupled to the first material, wherein the anode layer is configured to protect the first material from corrosion by the condensing corrosive gas.

12. The system of claim 11, comprising a power source that supplies power to a transformer rectifier coupled to the anode layer, wherein the transformer rectifier is configured to impress a current through the anode layer to actively protect the first material from corrosion by the condensing corrosive gas.

13. The system of claim 11, wherein the anode layer is a sacrificial anode layer.

14. The system of claim 11, wherein the anode layer comprises a pattern of a plurality of anode portions.

15. The system of claim 11, wherein the anode layer comprises a third material that is different from the first and second materials.

16. The system of claim 11, wherein the gasification component comprises an integrated gasification combined cycle (IGCC) component.

17. The system of claim 16, wherein the IGCC component comprises a gasifier, a gas treatment unit, or a combination thereof.

18. A system, comprising:
an active anode layer configured to protect a surface of a gasification component from corrosion by a gasification product gas;
a reference electrode in contact with the gasification product gas; and
a controller configured to adjust a current to the active anode layer in response to feedback from the reference electrode.

19. The system of claim 18, wherein the gasification component comprises an integrated gasification combined cycle (IGCC) component.

20. The system of claim 18, wherein the feedback from the reference electrode is indicative of an electrical potential difference across the reference electrode and the gasification component.

* * * * *

UNITED STATES PATENT AND TRADEMARK OFFICE
CERTIFICATE OF CORRECTION

| | | |
|---|---|---|
| PATENT NO. | : 8,372,251 B2 | Page 1 of 1 |
| APPLICATION NO. | : 12/785302 | |
| DATED | : February 12, 2013 | |
| INVENTOR(S) | : Goller et al. | |

It is certified that error appears in the above-identified patent and that said Letters Patent is hereby corrected as shown below:

On the Title Page, Item (56), under "OTHER PUBLICATIONS", in Column 2, Line 8, delete "al: Article-History of EFC-WP11" and
insert -- al., Article-History of EFC-WP11, --, therefor.

In the Specification

In Column 4, Line 61, delete "protentiostat" and insert -- potentiostat --, therefor.

Signed and Sealed this
Fourth Day of June, 2013

Teresa Stanek Rea
*Acting Director of the United States Patent and Trademark Office*